United States Patent
Reiss et al.

(10) Patent No.: US 9,809,312 B2
(45) Date of Patent: Nov. 7, 2017

(54) VENTILATION SYSTEM FOR A VEHICLE, WHICH VENTILATION SYSTEM IS CONTROLLABLE IN A DEMAND-ORIENTED MANNER

(71) Applicant: Airbus Operations GmbH, Hamburg (DE)

(72) Inventors: Matthias Reiss, Hamburg (DE); Ole Becker, Hamburg (DE); John Kwee, Hamburg (DE)

(73) Assignee: Airbus Operations GmbH (DE)

( * ) Notice: Subject to any disclaimer, the term of this patent is extended or adjusted under 35 U.S.C. 154(b) by 112 days.

(21) Appl. No.: 14/456,118

(22) Filed: Aug. 11, 2014

(65) Prior Publication Data
US 2014/0349561 A1    Nov. 27, 2014

Related U.S. Application Data

(63) Continuation of application No. PCT/EP2013/052464, filed on Feb. 7, 2013.

(30) Foreign Application Priority Data

Feb. 15, 2012   (DE) .................. 10 2012 003 008

(51) Int. Cl.
*B64D 13/00*     (2006.01)
*B60H 1/00*      (2006.01)
(Continued)

(52) U.S. Cl.
CPC ......... *B64D 13/00* (2013.01); *B60H 1/00021* (2013.01); *B60H 1/00371* (2013.01);
(Continued)

(58) Field of Classification Search
CPC .......................... B64D 13/00; B60H 1/00021
(Continued)

(56) References Cited

U.S. PATENT DOCUMENTS 5,695,396 A    12/1997  Markwart et al.
5,788,571 A *   8/1998  Ivison .................. F24F 7/06
                                              454/249
(Continued)

FOREIGN PATENT DOCUMENTS

CN       101198361 A      6/2008
CN       101987568 A      3/2011
(Continued)

OTHER PUBLICATIONS

Englesh translation of Abstract of JP 58217136A.*
(Continued)

*Primary Examiner* — Helena Kosanovic
(74) *Attorney, Agent, or Firm* — Lerner, David, Littenberg, Krumholz & Mentlik, LLP (57) ABSTRACT

A ventilation system for an interior room is provided, having a first air suction device, a second air suction device, a suction volume control device, a first air conduction pipe, a second air conduction pipe, a vacuum generating device and a control unit. The suction volume control device affects an air flow from the first and the second air suction device to the first and the second air conduction pipe, respectively, wherein the control unit controls the suction volume control device so that the air flow from the first air suction device to the first air conduction pipe is controllable.

3 Claims, 4 Drawing Sheets

Related U.S. Application Data (60) Provisional application No. 61/598,985, filed on Feb. 15, 2012.

(51) Int. Cl.
  *B60H 1/24* (2006.01)
  *F24F 7/00* (2006.01)
  *F24F 13/08* (2006.01)
  *B64D 11/02* (2006.01)
  *B64D 11/04* (2006.01)

(52) U.S. Cl.
  CPC ............... *B60H 1/245* (2013.01); *F24F 7/00* (2013.01); *F24F 13/08* (2013.01); *B64D 11/02* (2013.01); *B64D 11/04* (2013.01); *Y02T 50/44* (2013.01); *Y02T 50/56* (2013.01)

(58) Field of Classification Search
  USPC .......................................................... 454/76
  See application file for complete search history.

(56) References Cited

U.S. PATENT DOCUMENTS

| | | | |
|---|---|---|---|
| 6,159,091 A | 12/2000 | Horstman et al. | |
| 6,401,473 B1* | 6/2002 | Ng | B64D 13/06 454/71 |
| 7,622,074 B2 | 11/2009 | Mielnik | |
| 8,506,367 B2 | 8/2013 | Cermak et al. | |
| 2009/0014593 A1 | 1/2009 | Westenberger et al. | |
| 2010/0029190 A1* | 2/2010 | Dessero | B64D 13/08 454/76 |
| 2011/0183595 A1 | 7/2011 | Liebich | |

FOREIGN PATENT DOCUMENTS

| | | |
|---|---|---|
| DE | 93 12 068 U1 | 11/1993 |
| DE | 295 02 501 U1 | 4/1995 |
| DE | 195 09 773 C1 | 6/1996 |
| DE | 20 2006 012 724 U1 | 12/2006 |
| DE | 10 2007 019 820 A1 | 11/2008 |
| DE | 20 2009 006 043 U1 | 7/2009 |
| DE | 10 2008 017 521 A1 | 10/2009 |
| DE | 10 2011 104 866 A1 | 12/2012 |
| GB | 2 242 515 A | 10/1991 |
| JP | 58217136 A * | 12/1983 |

OTHER PUBLICATIONS

Chinese Office Action dated Sep. 22, 2015.
DE Search Report (dated Mar. 22, 2013)(10 2012 003 008.8).
International Search Report PCT/EP2013/052464 (dated Apr. 11, 2013).

* cited by examiner

VENTILATION SYSTEM FOR A VEHICLE, WHICH VENTILATION SYSTEM IS CONTROLLABLE IN A DEMAND-ORIENTED MANNER

CROSS-REFERENCE TO RELATED APPLICATIONS

The present application is a continuation of International Application No. PCT/EP2013/052464, filed Feb. 7, 2013, which application claims priority from German Patent Application No. 10 2012 003 008.8 filed Feb. 15, 2012 and U.S. Provisional Patent Application No. 61/598,985 filed Feb. 15, 2012, all of which are incorporated herein by reference.

FIELD OF THE INVENTION

The invention relates to ventilation systems. In particular, the invention relates to a ventilation system for an interior room, for example for an interior room of a vehicle, to an aircraft comprising a ventilation system, and to a method for adjusting an air suction quantity of a multitude of air suction devices of a ventilation system.

BACKGROUND OF THE INVENTION

In the context of passenger compartments in means of transport, in particular on board of aircraft, there is the aspect of ventilation, for example in the surroundings of a galley during the preparation or processing of foodstuffs, but also in lavatories or on-board toilets.

In this context, ventilation is used to remove or convey steam, odors or waste heat arising in the surroundings of, for example, cooling units. Likewise, ventilation systems are used for ventilating lavatories, for example in the case of excessive atmospheric humidity.

The exhaust air, i.e. air saturated with vapors, odors, heat or atmospheric humidity, is extracted in this process and conveyed as exhaust air by way of an air tube and an air duct system.

DE 10 2007 019 820 A1 and US 2009/0014593 A1 describe a combined ventilation system and cooling system for an airplane, wherein ventilation takes place by way of the extraction of air, and is essentially used for the removal of heat and thermal loads.

BRIEF SUMMARY OF THE INVENTION

There may be a need to provide a ventilation system that is characterized by a reduced or adaptable air volume flow or by a reduced requirement of air volume for ventilation.

A ventilation system for an interior room, an aircraft comprising a ventilation system, and a method for adapting an air suction quantity of a multitude of air suction devices of a ventilation system are provided.

Many of the characteristics described below with reference to the ventilation system can also be implemented as method-related steps and vice versa.

According to a first aspect of the invention, a ventilating system for an interior room is provided, which ventilating system comprises a first air suction device, a second air suction device, a suction volume control device comprising a first airflow throttling unit, a first air conduction pipe, a second air conduction pipe, a vacuum generating device and a control unit. In this embodiment, the first air suction device is assignable to a first suction volume, and the second air suction device can be is assignable to a second suction volume. The first airflow throttling unit is assigned to the first air conduction pipe and is adapted to throttle or control an airflow through the first air conduction pipe. The vacuum generating device is adapted to generate negative pressure in the first air conduction pipe and in the second air conduction pipe so that the first suction volume can be removed by suction by way of the first air suction device, and the second suction volume can be removed by suction via the second air suction device. The control unit is adapted to control the suction volume control device so that the airflow from the first air suction device to the first air conduction pipe is controllable.

The airflow, i.e. the air volume flow or volume of air flowing from the first air suction device to the first air conduction pipe and through the first air conduction pipe, can thus be regulated or controlled.

In this embodiment, controlling the airflow always results in an increase or a decrease in the air volume flowing through an air conduction pipe, i.e. a reduction or expansion of a volume of air, in particular of a quantity of exhaust air, is being achieved. In one embodiment the air volume flow can only be increased in that case where the airflow throttling unit does not let the maximum quantity of air flow through, and consequently the quantity passing through can be increased by means of an increase in the cross section of the air throttling unit if the negative pressure remains constant. In one embodiment a change in any of the input parameters, i.e. of the airflow resistance of the individual air conduction pipes, of the negative pressure in the ventilation system, and if applicable of positive pressure on one or several of the suction positions and on an interface between the air conduction pipe and the suction position has an effect on at least one of the output parameters, i.e. on the air volume flows in the air conduction pipes, on the ratio of the air volume flows in at least two air conduction pipes, and on the sum of the air volume flows in the air conduction pipes. In quantitative terms the values of the output parameters can either increase or decrease, depending on the input parameters. If the airflow throttling unit is already in a state in which the maximum air volume flow is allowed to pass through, i.e. which corresponds to suction provided by the vacuum generating device, any further increase is of course no longer applicable, or possible only by increasing the driving force by way of the vacuum generating device, i.e. by changing suction or the negative pressure.

Thus the ventilation system as described above and hereinafter enables the adjustment of a volume of air, which is to be transported by the ventilation system, in a demand-oriented manner.

This makes it possible, for example, for the ventilation system and the vacuum generating device to be designed with smaller dimensions. Consequently, the air duct system, i.e. for example the air conduction pipes or air pipes, can also be designed with smaller cross-sectional dimensions.

The air suction device can, for example, be designed as a suction nozzle or suction funnel and can, in particular, be used to extract and remove an air volume or a quantity of air from the surroundings of the air suction device. Furthermore, the air suction device can be designed in any form that enables extracting air from the surroundings of the air suction device.

The airflow throttling unit can, for example, be a throttle valve or a controllable aperture arranged in the air conduction pipe; this can also be a controllable valve. In generally, the airflow throttling unit is a device for controlling the flow of air through an air conduction pipe, in other words for controlling the air volume flow, which directly affects the quantity of air extracted and removed by the air suction device, and which can increase or decrease said quantity of air.

The airflow throttling unit can, for example, also act by changing the cross section of an air conduction pipe in that, for example, with the use of hydraulic, pneumatic or electrical means physical pressure is exerted on a flexible subsection, or a subsection whose shape can be varied, of an air conduction pipe, and the air conduction pipe in this manner varies, i.e. reduces, its cross section, or in the case of decreasing the physical pressure enlarges the cross section. In this embodiment, the physical pressure on the air conduction pipe is applied to the wall of the air conduction pipe in the direction of the interior of the air conduction pipe. The subsection whose shape can be varied, of the air conduction pipe, can in particular be designed so as to be elastic, namely so that this subsection due to its elastic properties returns to an initial state when the physical pressure has subsided, which initial state can in particular correspond to the maximum cross section, i.e. the maximum air volume flow.

In one embodiment the airflow throttling unit can be adapted in such a manner that the cross section of the airflow throttling unit, which cross section has been reduced by a driving force, maintains its reduced cross section even when the driving force is no longer applied. At that stage, in order to expand the cross section, it may be required to again apply a driving force in the corresponding operating direction so as to expand the cross section.

If the suction volume control device or an airflow throttling unit is controlled in such a manner that the airflow in an air conduction pipe increases, this results in the air suction device connected to this air conduction pipe also extracting an increased air volume. Conversely, the quantity of air extracted by the air suction device is reduced when the suction volume control device reduces the airflow through the corresponding air conduction pipe, for example in that the air volume flow through the air conduction pipe is reduced by the suction volume control device.

The vacuum generating device can, for example, be a fan. The vacuum generating device creates a pressure differential between part of the ventilation system, for example the air duct system, and the suction volume or the quantity of air to be extracted, and consequently, because of this pressure differential, the suction volume is extracted and removed by the air suction device.

In order to generate said pressure differential it is also possible, for example, to utilize a pressure differential between the interior room and the exterior surroundings of the interior room, for example if the interior room is a passenger compartment of an aircraft. Thus it is possible, for example, when an aircraft has reached cruising altitude, for a low atmospheric pressure to be applied to the air duct system of the ventilation system as described above and hereinafter so that the pressure differential ensures that the suction volume is removed by way of the suction device and the air conduction pipe of the ventilation system.

The control unit is used to select and control the suction volume control device and the airflow throttling unit; in other words the control unit can provide demand-oriented ventilation by way of the air suction devices in that the airflow throttling unit in the first air conduction pipe controls, i.e. increases or decreases, the air volume flow or the quantity of air flowing through the first air conduction pipe.

Furthermore, the control unit may control the vacuum generating device in such a manner that negative pressure or suction in the entire ventilation system can directly be controlled by controlling the vacuum generating device. The control unit can control the vacuum generating device as an alternative or in addition to the air throttling elements.

According to one embodiment of the invention, the suction volume control device comprises a second airflow throttling unit, wherein the second airflow throttling unit is assigned to the second air conduction pipe and is adapted to throttle or control an airflow through the second air conduction pipe. The control unit is adapted to control the suction volume control device in such a manner that the airflow from the second air suction device to the second air conduction pipe may be controllable.

Thus, the ventilation system enables apportioning the air volume flow to the first air suction device and to the second air suction device, whereby ventilation by way of the respective air suction device can take place in a demand-oriented manner in that the suction volume control device determines the airflow or the air volume or the air volume flow through the first air conduction pipe or through the second air conduction pipe.

This ventilation, controllable in a demand-oriented manner, by way of the first air suction device and by way of the second air suction device is, in particular, advantageous when exhaust air to be removed occurs at different points in time in the surroundings of the first air suction device and in the surroundings of the second air suction device. Thus by means of the ventilation system as described above and hereinafter a demand for ventilation can be detected, and ventilation can be carried out so as to match the local requirements in the surroundings of the respective air suction devices.

For example, in the surroundings of a refrigerator in aircraft a main heat load, which needs to be removed, arises immediately after the refrigerator has been filled, i.e. prior to or at the beginning of a flight, for example when a target temperature in the cooling space of the refrigerator is just being reached and thus increased heat removal by way of the cooling circuit takes place. In contrast to this, in the region of a food preparation unit any exhaust air arises only at the time of preparation or processing of the food, i.e. not at the beginning of the flight but at a later stage of the flight.

The greatest exhaust air load in the surroundings of the refrigerator and in the surroundings of the ovens for meal preparation thus arises at different points in time. The ventilation system as described above and hereinafter thus enables, in this scenario of dynamically changing exhaust air loads in various regions, achieving demand-oriented, energy-saving and more silent ventilation.

As a result of individually matching the air volume flow by means of an air suction device the overall quantity of exhaust air in the interior room can be reduced. In particular in the aviation industry or in aircraft this can result in considerable savings of energy and materials or weight of the aircraft.

The ventilation system as described above and hereinafter enables dynamically adjusting and specifying the air volume flow for ventilation by way of the air suction device demand oriented, thus reducing, for example, the energy expenditure required for ventilation and for maintaining the pressure; in other words the pressure loss in the interior room as a result of ventilation is reduced.

In the field of aircraft, in particular airplanes, a ventilation system as described above and hereinafter may, for example, be used for the ventilation of apparatus in food preparation units, e.g. of ovens for the preparation or processing of food, as well as of refrigerators, lavatories, on-board toilets, passenger compartments or electronic devices. In this embodiment, the ventilation system can be used for the removal of vapors, odors, heat, smoke and other exhaust air.

According to a further embodiment of the invention, the ventilation system further comprises a fan that is designed to generate the negative pressure in the vacuum generating device.

As an alternative or in addition to the fan, any other suitable device can be used for generating the negative pressure. The vacuum generating device can be designed in any form that provides a suitable pressure sink for removing the quantity of air from the suction devices. This also refers to any combination of fans and valves to a pressure sink. For example, a vacuum pump can be used as a suction generating device.

According to a further embodiment of the invention, the ventilation system further comprises means for determining a ventilation requirement relating to a suction volume, wherein the suction volume control device and/or the airflow throttling units can be controlled on the basis of the determined ventilation requirement.

These means may be, for example, a temperature sensor, a switch, a detector for chemical compounds, for example a methane sensor, or an atmospheric humidity sensor.

These means may, for example, be connected to the control unit by way of a data network, wherein the control unit can be adapted to receive and evaluate signals from these means and, depending on these signals or the corresponding signal values, can control an airflow throttling unit or the vacuum generating device in such a manner that the air volume flow of the exhaust air in a suction volume assigned to the means is controlled according to the ventilation requirement.

The data network may be adapted to transmit the signal values of the means for determining the ventilation requirement to the control unit and also to transmit the control signals of the control unit to the suction volume control device or the vacuum generating device. In this embodiment, signal transmission can be implemented in any form that makes it possible to communicate by way of a data network between a transmitter and a receiver.

In other words this means that, for example, when an oven is switched on, either a signal is directly transmitted to the control unit and the control unit initiates an increase in the air volume flow of the exhaust air in the region of the switched-on oven, or a temperature sensor is arranged in the region of the oven and as the temperature rises an increase in the air volume flow of the exhaust air through the control unit is initiated. Likewise, for example, the air volume flow of the exhaust air in a lavatory or in an on-board toilet can be increased when the door of the lavatory or of the on-board toilet is being closed and locked. As an alternative or in addition the ventilation requirement in an on-board toilet can also be determined by means of a methane sensor.

Apart from this exemplary list of means for determining the ventilation requirement, other means that are suitable to signal a ventilation requirement to the control unit can also be used.

According to a further embodiment of the invention, the ventilation system furthermore comprises a central air conduction pipe. In this embodiment, the first air conduction pipe and the second air conduction pipe are connected to the central air conduction pipe and are adapted to supply the airflow to the central air conduction pipe. The vacuum generating device is adapted to generate negative pressure in the central air conduction pipe so that in the first air conduction pipe and in the second air conduction pipe negative pressure is also generated.

The ventilation system as described above and hereinafter enables, in particular, to design a central air conduction pipe with smaller dimensions, i.e. to provide a central air conduction pipe with a reduced cross section, because the first air conduction pipe and the second air conduction pipe supply a demand-oriented air volume flow of exhaust air so that the dimension of the central air conduction pipe can be smaller. In this embodiment, the available maximum air volume flow through the central air conduction pipe can be distributed in a demand-oriented manner to the first air suction device and to the second air suction device, i.e. in the assessment of the central air volume flow, for example, the point in time when the maximum ventilation requirement or the maximum air volume flow of the first air suction device and of the second air suction device arises can be taken into account.

The suction volume control device makes it possible in the ventilation system, for example, to adjust the air volume flow through the first air conduction pipe, whereas the air volume flow through the second air conduction pipe can remain constant. As an alternative, the sum of the air volume flows through the first air conduction pipe and through the second air conduction pipe, i.e. the air volume flow through the central air conduction pipe, can remain constant, wherein the air volume flow in the second air conduction pipe behaves in a complementary manner to the air volume flow in the first air conduction pipe. This means that a reduction in the air volume flow in the first air conduction pipe results in an increase in the air volume flow in the second air conduction pipe, and an increase in the air volume flow in the first air conduction pipe results in a reduction in the air volume flow in the second air conduction pipe.

If, for example, it is to be expected that the second suction volume always requires more ventilation, i.e. a higher air volume flow for ventilation, than the first suction volume, in the case of a constant or specified sum of the air volume flow (i.e. of the air volume flow through the central air conduction pipe) through the first air conduction pipe and through the second air conduction pipe, throttling of the flow through the first air conduction pipe and control of the entire extracted quantity of air (i.e. of the air volume flow through the central air conduction pipe) is sufficient to increase an air volume flow in the second air conduction pipe, without this requiring an air throttling unit to be provided in the second air conduction pipe.

However, it is also possible in each case to provide an airflow throttling unit in the first air conduction pipe and in the second air conduction pipe so that, for example, by way of throttling of the airflow in the second air conduction pipe, the air volume flow in the first air conduction pipe can be increased with a predefined total air volume flow through the first and the second air conduction pipes.

It should be clearly emphasized that it is, of course, also possible to connect more than two air suction devices to the central air conduction pipe, in each case by way of an air conduction pipe. The ventilation system as described above and hereinafter can comprise a multitude of air suction devices and air conduction pipes that are connected to the central air conduction pipe, even though due to better illustration purposes the ventilation system has hitherto been described as comprising only a first air suction device and a second air suction device.

For example, a ventilation system as described above and hereinafter makes it possible to predetermine an entire air volume flow of a food preparation unit in that the sum of the air volume flow of the exhaust air of an oven and of a refrigerator is specified. Irrespective of this further apportioning of the air volume flow, for example between the oven and the refrigerator, can take place by the suction volume control device and the airflow throttling units.

Likewise, an entire air volume flow in a lavatory can be specified, and the air volume flow of the exhaust air in the lavatory can nevertheless be apportioned to several air suction devices, for example in a wash region or shower region and in a toilet region.

Thus the ventilation system makes it possible to control the air volume flow of the exhaust air at various levels. At a first level the air volume flow of an individual air suction device can be controlled, whereas at a second level the air volume flow of a group of a multitude of air suction devices can be specified, for example of all the air suction devices in a lavatory or in a food preparation unit.

Specifying the air volume flow of the exhaust air at several levels makes it possible to implement more flexible apportioning of the available air volume flow so that ventilation in a demand-oriented manner can be achieved.

According to a further embodiment of the invention, the suction volume control device comprises a third airflow throttling unit, wherein the third airflow throttling unit is adapted to throttle or control an airflow in the central air conduction pipe.

Thus, in addition to the above-described first level and second level of control of the air volume flow of the exhaust air, a third level for controlling the air volume flow is added, namely controlling the air volume flow in the central air conduction pipe.

In this manner it is possible, for example, to influence the air volume flow of the entire exhaust air of the ventilation system in the interior room.

As an alternative or in addition to the third airflow throttling unit the air volume flow in the central air conduction pipe can also be controlled, i.e. increased or decreased, in that the control unit controls the vacuum generating device in such a manner that the entire quantity of the extracted air is increased or decreased.

The ventilation system as described above and hereinafter thus makes it possible to apportion the available air volume flow to all the ventilation regions in the interior room. By demand-oriented adjustment of the exhaust air or of the air volume flow of the exhaust air the overall quantity of air required for ventilation may be reduced. Consequently the ventilation system can be operated with less energy expenditure and, for example, the noise arising from ventilation may be reduced.

According to a further embodiment of the invention, the ventilation system further comprises a pressure valve, wherein the pressure valve is assigned to the central air conduction pipe and is adapted to apply an ambient pressure, which can, in particular, be negative pressure relative to the pressure in the interior room, to the air conduction pipes so that negative pressure is generated in the air conduction pipes.

This embodiment is advantageous in particular in aircraft, because the atmospheric pressure at cruising altitude of the aircraft is significantly lower than the pressure in the passenger compartment of the airplane so that by means of the pressure differential between the passenger compartment of the aircraft and the atmospheric pressure in the surroundings a suction in the air duct system of the ventilation system may be maintained, wherein the suction is used for the removal of the exhaust air.

The removal of the exhaust air from the interior room thus unavoidably results in a loss of pressure in the interior room. This loss of pressure needs to be compensated for by expending energy, wherein this energy can be saved to an extent to which a loss of pressure can be reduced in that the quantity of exhaust air is reduced. The ventilation system as described above and hereinafter makes it possible to minimize the exhaust air, and consequently the pressure loss in the interior room, and thus the energy expenditure for maintaining the pressure in the interior room, is also reduced.

According to a further embodiment of the invention, the ventilation system comprises an exhaust air storage device for receiving exhaust air. In this arrangement the first air conduction pipe and the second air conduction pipe are connected to the exhaust air storage device so that an airflow from the air suction devices to the exhaust air storage device is made possible.

The exhaust air storage device can be a collection space for the exhaust air of the ventilation system. The ventilation system can, of course, also comprise a multitude of exhaust air storage devices, in which case, for example, a decentralized design of the air duct system of the ventilation system is made possible because one or several exhaust air storage devices including the respectively assigned air suction devices and air conduction pipes can in each case be locally arranged in the surroundings where exhaust air arises.

For example, a first exhaust air storage device could be provided for the lavatories and toilets, and a second exhaust air storage device could be provided for the food preparation units.

In this embodiment, the exhaust air storage device has the same function as the central air conduction pipe mentioned earlier. It is thus no longer necessary to provide a central air conduction pipe, which could, for example, save weight and installation space in an aircraft. In this embodiment, the position, size and shape of the exhaust air storage device can be in any form that makes it possible to collect and store exhaust air.

In a decentralized design of the ventilation system with a multitude of exhaust air storage devices, demand-oriented adjustment of the air volume flow of the individual air suction devices, which are assigned to an exhaust air storage device, can be implemented as described above and hereinafter.

According to a further embodiment of the invention, the suction volume control device is adapted to predetermine a total suction volume of the exhaust air storage device.

In this embodiment, the total suction volume relates to the sum of all the air volume flows of the air conduction pipes or air suction devices, which air volume flows are assigned to an exhaust air storage device.

Analogously, as far as specifying the total suction volume of an exhaust air storage device is concerned, the same applies as has already been described in detail above in the context of specifying the air volume flow through the central air conduction pipe. Analogously, in this process the air volume flow of each individual air suction device can be predetermined, but it may also be possible to predetermine the total suction volume, i.e. the air volume flow, of an exhaust air storage device.

According to a further aspect of the invention, an aircraft comprising a ventilation system as described above and hereinafter is provided. In this embodiment, one of the first suction volume and the second suction volume is a space selected from the group comprising a galley, an on-board toilet, and a lavatory.

The aircraft may in particular be an aircraft for transporting passengers, for example an airplane or passenger aircraft. However, it can also be an aircraft for transporting cargo.

Furthermore, the ventilation system as described above and hereinafter can, of course, also be used in other vehicles, for example in water craft, terrestrial vehicles and in aircraft, in particular in vehicles adapted for transporting passengers.

According to a further aspect of the invention, an aircraft comprising a ventilation system as described above and hereinafter is provided, wherein the interior room corresponds to a passenger cabin of the aircraft, and wherein the central air conduction pipe is adapted to convey the airflow from the passenger cabin to the exterior of the passenger cabin.

In particular, the exhaust air can be extracted by way of the central air conduction pipe into the surroundings of the aircraft in that, for example, suction based on a pressure differential between an interior pressure in the passenger cabin and an exterior pressure in the surroundings of the aircraft is used.

According to a further aspect of the invention, an aircraft with a ventilation system as described above and hereinafter is provided, wherein the exhaust air storage device corresponds to a bilge.

A bilge is a collection container for exhaust air and waste water in an airplane, wherein emptying of the bilge occurs after the aircraft has landed. Thus, during a flight, the aircraft comprising a ventilation system with a bilge represents a closed ventilation system.

According to a further aspect of the invention, a method for adjusting an air suction quantity of a first air suction device and of a second air suction device is provided, wherein the first air suction device is connected to a first air conduction pipe, and the second air suction device is connected to a second air conduction pipe, with each suction device being assignable to a suction volume, wherein the first air conduction pipe and the second air conduction pipe are connected to a central air conduction pipe, and wherein in the first air conduction pipe a first airflow throttling unit is arranged, wherein the method comprises the following steps: determining a ventilation requirement through the first air suction device in the suction volume assigned to the first air suction device in a first step, and adjusting an airflow in the first air conduction pipe by means of the first airflow throttling unit in a second step.

The method thus enables achieving the demand-oriented and flexible specification of the air volume flow of an air suction device, and consequently in particular a ventilation system can be adapted or constructed and operated in an energy saving and noise reducing manner.

In case of a predetermined air volume flow through the central air conduction pipe, by way of the first airflow throttling unit the air volume flow in the first air conduction pipe can be changed, and consequently the air volume flow in the second air conduction pipe is directly controlled, and said air volume flow is altered as a result of the constant air volume flow in the central air conduction pipe complementary to the air volume flow of the first air conduction pipe. Thus by way of controlling an individual airflow throttling unit the air volume flow in two air conduction pipes can be controlled.

According to one embodiment of the invention, a second airflow throttling unit is arranged in the second air conduction pipe, wherein the method furthermore comprises the following step: adjusting an airflow in the second air conduction pipe by means of the second airflow throttling unit.

This makes it possible, on the one hand, to individually adjust the air volume flow in the first air conduction pipe and in the second air conduction pipe by way of separate selection of the respective airflow throttling units and, on the other hand, to adjust the total air volume flow in the central air conduction pipe by way of coordinated control of both airflow throttling units.

According to a further embodiment of the invention, a third airflow throttling unit is arranged in the central air conduction pipe, wherein the method, further comprises the following step: adjusting an airflow in the central air conduction pipe by means of the third airflow throttling unit.

Thus, the method makes it possible to adjust the airflow or the air volume flow of the exhaust air in a ventilation system at several levels, namely apart from specifying the air volume flow of each individual air suction device and air conduction pipe in addition to specify the air volume flow of a group of air suction devices, as has been described in detail above.

Of course, the air suction devices could also be divided into more groups than merely a first group and a second group. Instead, the method can be applied in the context of air suction devices that are divided into any number or a multitude of groups.

It should be noted that determining the air volume flow can also, for example, take place with reference to a flight phase of an aircraft. For example, the air volume flow of the air suction devices in lavatories and on-board toilets can be reduced for the duration of a takeoff phase or a landing phase of an airplane.

Below, exemplary embodiments of the invention are described with reference to the drawings.

DETAILED DESCRIPTION

The illustrations in the figures are schematic and not to scale.

If in the following description of the drawings the same reference characters are being used, they relate to identical or similar elements.

Figure 1:
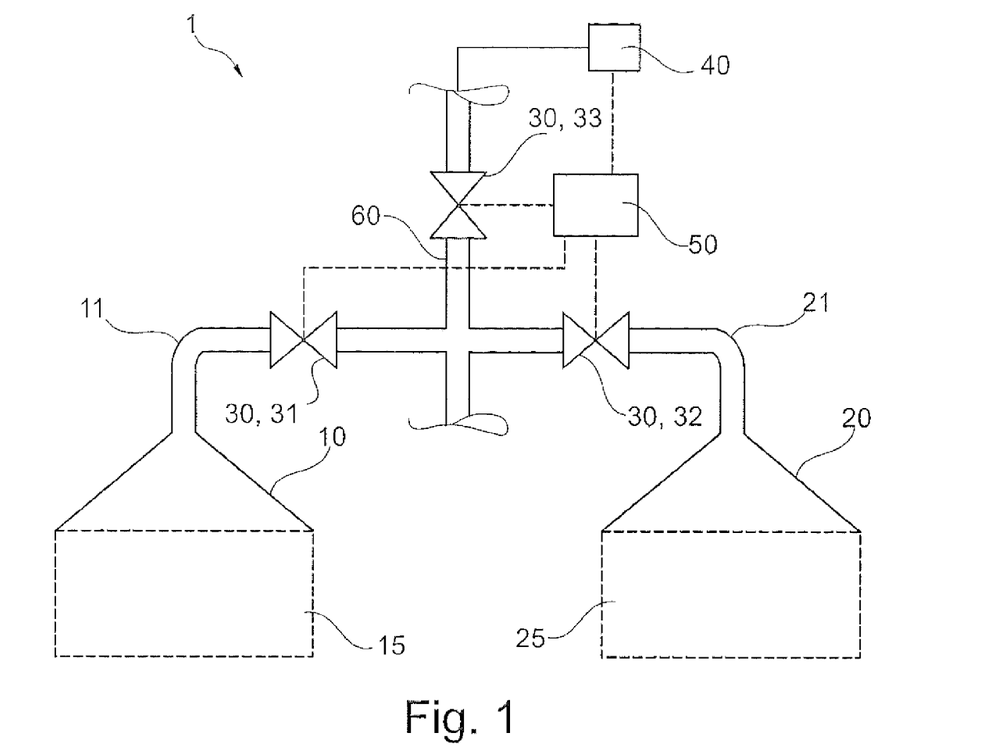
FIG. 1 illustrates a schematic view of a ventilation system according to an exemplary embodiment of the invention.

FIG. 1 shows a ventilation system 1, wherein the ventilation system comprises a first air suction device 10 and a second air suction device 20. Each of the air suction devices 10, 20 are assigned to a respective suction volume 15, 25, wherein the first air suction device 10 is connected by way of a first air conduction pipe 11 to a central air conduction pipe 60, and the second air suction device 20 is connected by way of a second air conduction pipe 21, to the central air conduction pipe 60.

In all air conduction pipes 11, 21, 60 an airflow throttling unit in the form of a controllable throttle valve 31, 32, 33 is arranged, wherein the air flow through said throttle valve 31, 32, 33 can be predetermined by way of the control unit 50.

The ventilation system 1 makes it possible, by way of the throttle valves 31, 32, 33, to specify the air volume flow through the first air conduction pipe 11, the second air conduction pipe 21 and the central air conduction pipe 60. As a result of the individual control of the throttle valves 31, 32, 33 the air volume flow at a first level, i.e. in the air conduction pipes 11, 21, can take place separately in relation to the first air suction device and the second air suction device; and at a second level, i.e. in the central air conduction pipe 60, can take place in relation to sum of the air volume flow of the first air conduction pipe 11 and of the second air conduction pipe 21.

In the surroundings of a food preparation unit, for example, the first air suction device can be assigned to an oven, and the second air suction device 11 can be assigned to a refrigerator, wherein the throttle valve 31 in the assigned air conduction pipe 11 is adjusted in such a manner that the respective air volume flow is determined according to the ventilation requirement. Thus, all ventilation relating to the requirements of the food preparation unit may be determined by way of the throttle valve 33 in the central air conduction pipe 60, and ventilation relating to the apparatus in the food preparation unit, i.e. the oven and the refrigerator, can be determined separately, by way of the throttle valves 31, 32 in the first air conduction pipe 11 and in the second air conduction pipe 21.

Of course, the ventilation system 1 can also comprise more than two air suction devices, for which in each case the air volume flow can be determined individually.

Figure 2:
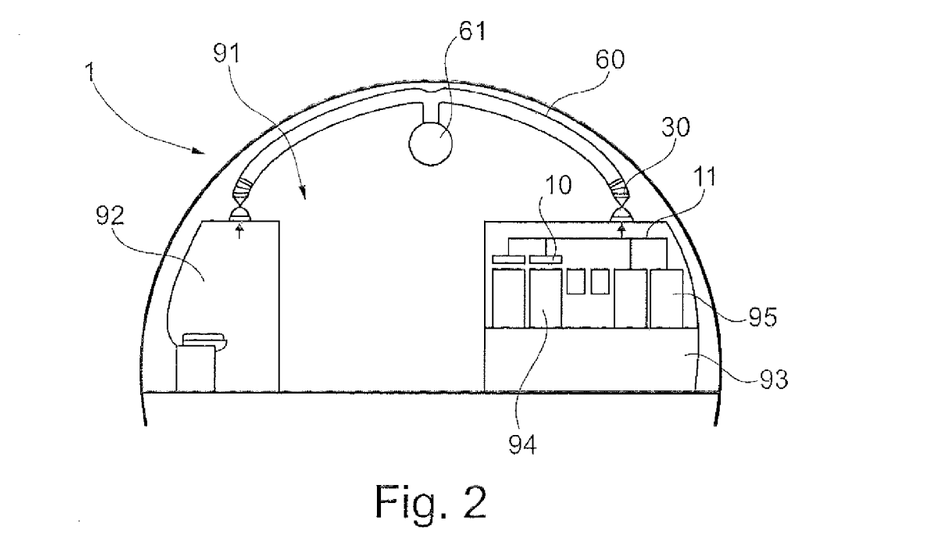
FIG. 2 illustrates a schematic view of an interior room of an aircraft comprising a ventilation system according to an exemplary embodiment of the invention.

FIG. 2 shows a schematic view of an airplane fuselage with a passenger cabin 91 in which a ventilation system is used for ventilating a galley 93 and an on-board toilet 92.

The galley 93 comprises refrigerators 94 and ovens 95, wherein an air suction device 10 is assigned to each of said devices, which air suction devices in turn are connected to a central air conduction pipe 60 by way of an air conduction pipe 11. The on-board toilet 92 comprises an air suction device, wherein the aforesaid is directly connected to the central air conduction pipe 60.

The central air conduction pipe 60 in turn is connected to a global air conduction pipe 61 that takes up the exhaust air of the entire airplane and removes said exhaust air.

Even though not shown in FIG. 2 for reasons of better illustration, the global air conduction pipe 61 may, as the first air conduction pipe 11 and the central air conduction pipe 60 do, comprise an airflow throttling unit.

In this way it may be possible for the air volume flow through the air duct system, i.e. through all of the air conduction pipes, to be controlled at three levels: in the air conduction pipes 11, 21, which are directly connected to the air suction devices, in relation to each individual air suction device (level one); in the central air conduction pipes 60 in relation to all of the air suction devices, which are connected to the respective central air conduction pipe (level two); and in the global air conduction pipe 61 in relation to the totality of all the air suction devices in the passenger compartment 91 (level three).

Instead of regulation of the air volume flow at said level three by way of a throttle valve in the global air conduction pipe, the air volume flow in this global air conduction pipe can also be achieved by controlling the vacuum generating device in order to achieve a reduction or an increase in the quantity of air.

Figure 3:
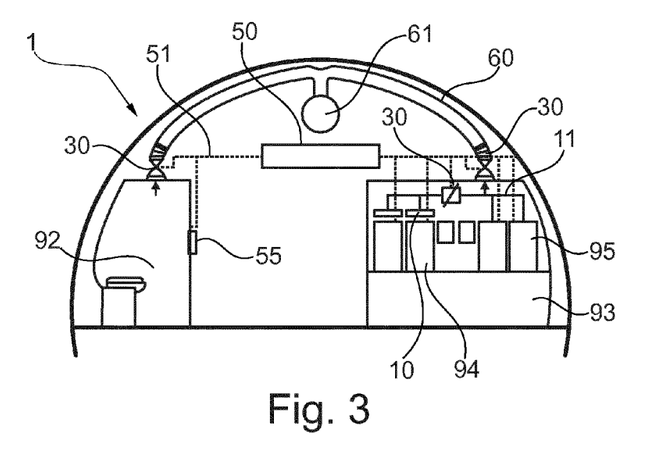
FIG. 3 illustrates a schematic view of an interior room of an aircraft comprising a ventilation system according to a further exemplary embodiment of the invention.

FIG. 3 expands the illustration in FIG. 2 by a control unit 50 and sensors 55 for determining the ventilation requirement of the individual regions to be ventilated. Furthermore, FIG. 3 shows a throttle valve 30 that is arranged in the first air conduction pipe 11 and that is adapted to specify the air volume flow of the galley appliances 94, 95.

The control unit 50 is connected by way of a data network 51 to the sensors for determining the ventilation requirement and to the throttle valves 30. On the toilet door a switch may be arranged that indicates whether the toilet door is closed and locked, which would, for example, signal that the ventilation requirement in the toilet increases. The refrigerators may comprise a temperature sensor for determining the exhaust air temperature, whereas the ovens indicate a ventilation requirement when they are switched on or when sensors indicate a rise in the temperature or an increase in vapors or odors.

Depending on the signals from the sensors, the control unit 50 controls the throttle valves 30 so that in the regions with an indicated ventilation requirement the air volume flow is increased, and in the regions without a ventilation requirement the air volume flow is reduced.

It should be noted that the sensors may indicate a ventilation requirement not just in relation to the quality but also in relation to the quantity. This means that it may be possible to differentiate not only between the states of "ventilation requirement" and "no ventilation requirement" but also that the intensity of the ventilation requirement can be stated.

The ventilation requirement can, for example, be regulated by way of a control circuit and may adjust to the prevailing conditions in the ventilation areas, i.e. in the suction volumes.

Figure 4:
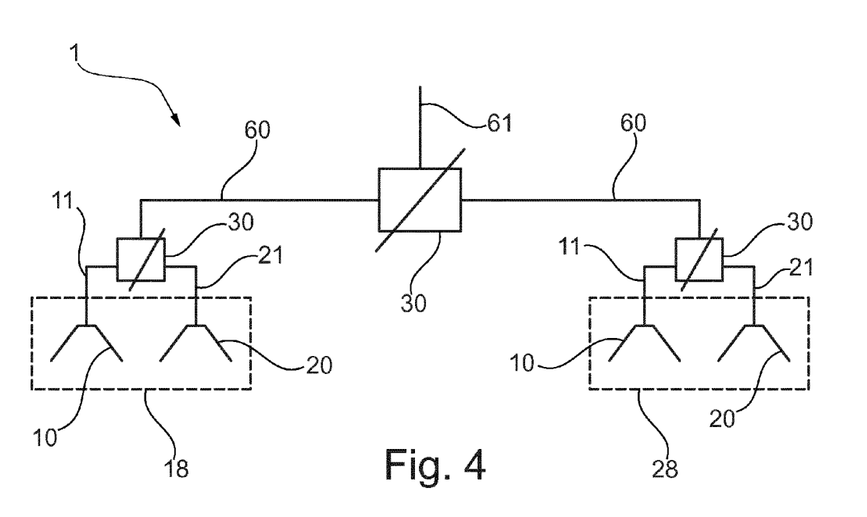
FIG. 4 illustrates a schematic view of a ventilation system according to a further exemplary embodiment of the invention.

FIG. 4 illustrates the adjustment of the air volume flow at different levels. A first group 18 of air suction devices 10, 20 is connected by way of an airflow throttling unit in the form of a throttle valve 30 to the central air conduction pipe 60. This throttle valve 30 is adapted to individually adjust the air volume flow of the air suction devices 10, 20 and of the central air conduction pipe 60.

The throttle valves 30 are functionally arranged on the connection points between the first air conduction pipe, the second air conduction pipe, and the central air conduction pipe. It should be noted that FIG. 3 shows only a substitute image of the functional arrangement, i.e. the air throttling units may certainly be arranged individually in the respective air conduction pipes.

A second group 28 of air suction devices 10, 20 is adapted in a manner analogous to the first group 18, and the above elaborations apply analogously.

Regulation of the air volume flow of the individual air suction devices 10, 20 in the first or second air conduction pipe corresponds to regulation at the first level.

The first group of air suction devices and the second group of air suction devices are connected to the global air conduction pipe 61 via a central air conduction pipe 60 by way of a further throttle valve 30.

At this position, regulation of the air volume flow of the first group 18 and of the second group 28 of air suction devices may occur, and thus regulation of the air volume flow at a second level.

At a third level the air volume flow can be regulated in that regulation takes place in the global air conduction pipe 61.

FIG. 3 thus shows a modular design, i.e. to each of the air conduction pipes a branch line to several air conduction pipes or to an air suction device may be connected.

Figure 5:
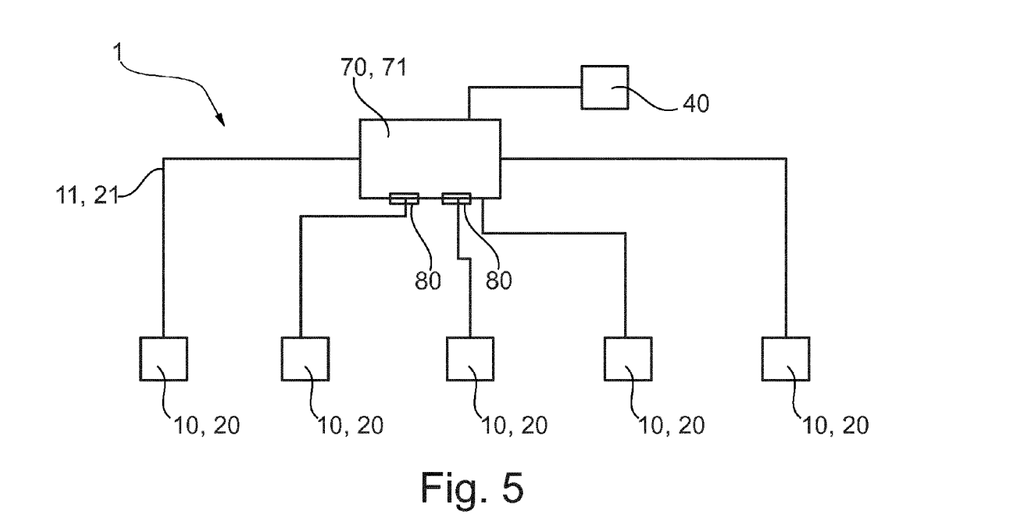
FIG. 5 illustrates a schematic view of a ventilation system according to a further exemplary embodiment of the invention.

FIG. 5 shows an exemplary embodiment of the invention, in which exemplary embodiment the air suction devices 10, 20 in each case are connected, by way of an air conduction pipe 11, 21, to an exhaust air storage device 70 in the form of a bilge 70 as a collection container for exhaust air.

The bilge can be connected to a vacuum generating device 40 that generates a necessary negative pressure or suction in order to convey the exhaust air by way of the air suction devices and the air conduction pipes to the bilge. In this embodiment, the vacuum generating device can, for example, be a vacuum pump, or as an alternative an atmospheric pressure or negative atmospheric pressure from the surroundings of an aircraft can generate negative pressure in the exhaust air storage device, i.e. in the bilge.

As an alternative or in addition to the vacuum generating device, a fan 80 can be provided on an air conduction pipe, which fan may generate or increase suction for the removal of exhaust air.

Figure 6:
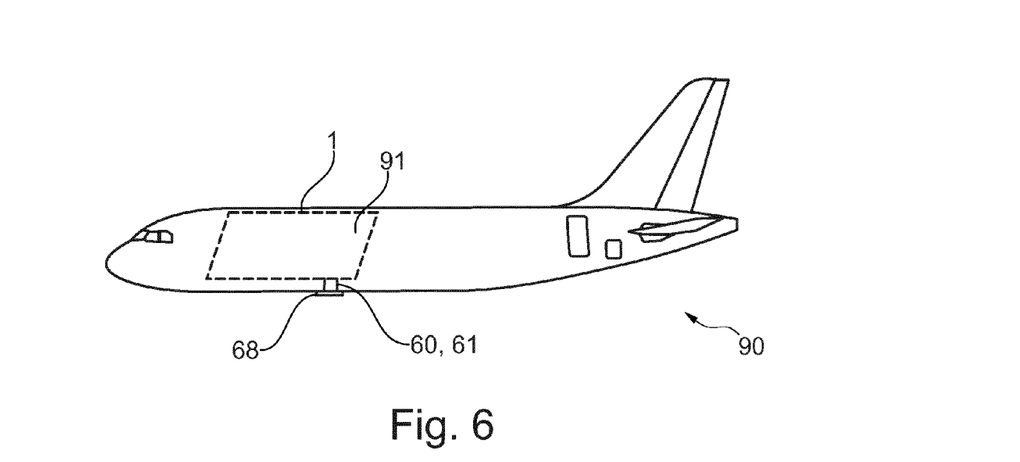
FIG. 6 illustrates an airplane comprising a ventilation system according to an exemplary embodiment of the invention.

FIG. 6 shows an airplane 90 comprising a ventilation system 1 as described above and hereinafter, wherein the ventilation system is arranged in the passenger cabin 91 of the airplane.

The ventilation system 1 is connected to the surroundings by way of its central air conduction pipe 60 or its global air conduction pipe 61 via a pressure valve 68. In this manner, when the airplane has reached cruising altitude, the atmospheric pressure, which is lower in comparison to the cabin pressure, can be applied by way of the pressure valve 68 to the air duct system of the ventilation system 1, and in this manner suction for extracting the exhaust air can be generated.

Figure 7:
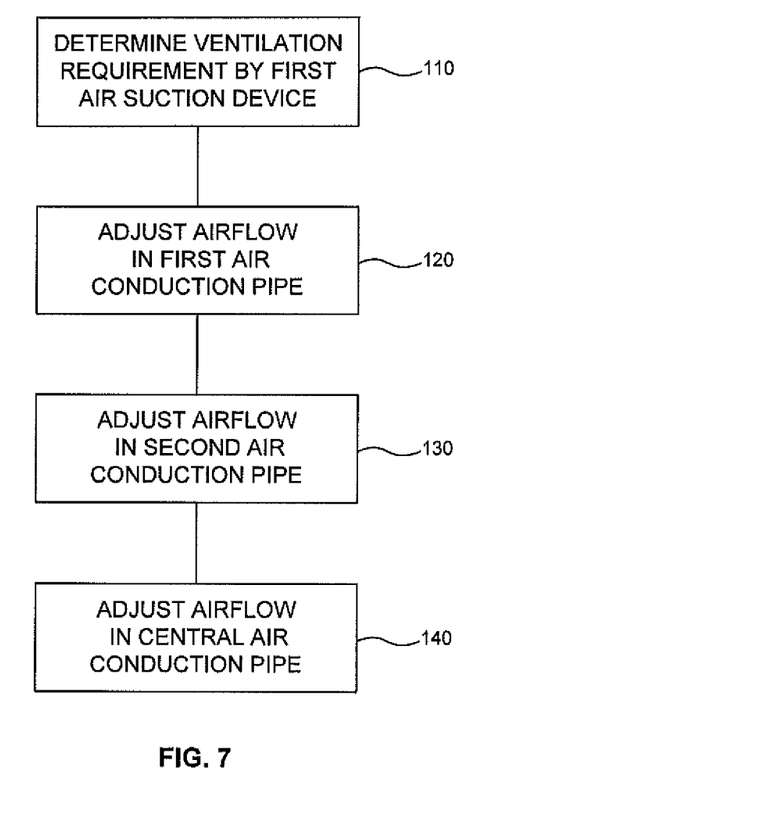
FIG. 7 illustrates a schematic view of the steps of a method according to an exemplary embodiment of the invention.

FIG. 7 shows a schematic overview of the steps of a method 100 for adjusting an air suction volume of a first air suction device and of a second air suction device, wherein the first air suction device is connected to a first air conduction pipe, and the second air suction device is connected to a second air conduction pipe, and wherein the aforesaid are assignable to a suction volume, and wherein in the first air conduction pipe a first airflow throttling unit is arranged.

In a first step 110 the ventilation requirement is determined by the first air suction device in the suction volume assigned to the first air suction device. Such determination of the ventilation requirement makes it possible to provide demand-oriented ventilation of a suction volume.

In a second step 120 adjustment of the airflow in the first air conduction pipe takes place by means of the first airflow throttling unit.

In a third step 130 the airflow through the second air conduction pipe, i.e. the air volume flow through the second air conduction pipe, is adjusted. This refers to the adjustment of the air volume flow at the first level, i.e. relating to an individual air suction device.

In a fourth step 140 the airflow through the central air conduction pipe, i.e. the air volume flow through the central air conduction pipe, is adjusted.

This determination can, in particular, take place by means of the control unit that detects a ventilation requirement by way of sensors or sensor signals.

It should be noted that it is not mandatory for the method-related steps to be carried out in the order elucidated above. Instead, for example, step 140, in which the air volume flow relating to the central air conduction pipe is determined, can be carried out prior to steps 120 and 130, in which the air volume flow through the first and through the second air conduction pipes is determined or adjusted.

The method-related steps can, in particular, be adapted in the form of a control circuit, wherein in this case the steps are carried out periodically.

In addition, it should be noted that "comprising" does not exclude other elements or steps, and "a" or "one" does not exclude a plurality of such elements. Furthermore, it should be noted that features or steps which have been described with reference to one of the above exemplary embodiments can also be used in combination with other features or steps of other exemplary embodiments described above. Reference characters in the claims are not to be interpreted as limitations.

The invention claimed is:

1. A ventilation system for an interior room, the ventilation system comprising:
   a first air suction device and a second air suction device;
   a suction volume control device comprising a first airflow throttling unit, a second airflow throttling unit, and a third airflow throttling unit;
   a first air conduction pipe and a second air conduction pipe;
   a central air conduction pipe, the first air conduction pipe and the second air conduction pipe being connected to the central air conduction pipe and adapted to provide the airflow to the central air conduction pipe;
   a vacuum generating device; and
   a control unit;
   wherein the first air suction device is assignable to a first suction volume, and the second air suction device is assignable to a second suction volume,
   wherein the first airflow throttling unit is assigned to the first air conduction pipe and is adapted to throttle an airflow through the first air conduction pipe by increasing or decreasing a cross-section of the first air conduction pipe,
   wherein the second airflow throttling unit is assigned to the second air conduction pipe and is adapted to throttle an airflow through the second air conduction pipe by increasing or decreasing a cross-section of the second air conduction pipe,
   wherein the third airflow throttling unit is adapted to throttle an airflow in the central air conduction pipe by increasing or decreasing a cross-section of the third air conduction pipe,
   wherein the vacuum generating device is adapted to generate negative pressure in the first air conduction pipe and in the second air conduction pipe so that the first suction volume can be removed via the first air suction device by suction, and the second suction volume can be removed via the second air suction device by suction;
   wherein the vacuum generating device is adapted to generate negative pressure in the central air conduction pipe so that in the first air conduction pipe and in the second air conduction pipe negative pressure is generated,
   wherein the control unit is adapted to control the suction volume control device so that the airflow from the first air suction device to the first air conduction pipe is controllable, wherein the control unit is adapted to control the suction volume control device such that the airflow from the second air suction device to the second air conduction pipe is controllable, wherein the control unit is configured to adjust the ratio of the air volume flow in the first air conduction pipe and the second air conduction pipe as well as the sum of the air volume flows by controlling the first throttling unit, the second throttling unit, and the third throttling unit, wherein the control unit is configured to instruct the vacuum generating device to increase the negative pressure in case the maximum size of the cross section of the opening of the third throttling unit is achieved, and wherein the control unit is configured to control the air volume flow in first, second and third levels by controlling one or more of the first and second air suction devices, the first, second and third airflow throttle units, the sum of the air volume flows of the first and second air conduction pipes and the air volume flow of the central air conduction pipe.

2. The ventilation system according to claim 1, comprising a pressure valve; wherein the pressure valve is assigned to the central air conduction pipe and is adapted to apply an ambient pressure to the air conduction pipes so that negative pressure is generated in the air conduction pipes.

3. An aircraft comprising a ventilation system, wherein the ventilation system comprises:
   a first air suction device and a second air suction device;
   a suction volume control device comprising a first airflow throttling unit, a second airflow throttling unit, and a third airflow throttling unit, wherein each airflow throttling unit is configured to control an air flow volume through an air conduction pipe;
   a first air conduction pipe and a second air conduction pipe;
   a central air conduction pipe, the first air conduction pipe and the second air conduction pipe being connected to the central air conduction pipe and adapted to provide the airflow to the central air conduction pipe;
   a vacuum generating device; and
   a control unit;
   wherein the first air suction device is assignable to a first suction volume, and the second air suction device is assignable to a second suction volume;
   wherein the first airflow throttling unit is assigned to the first air conduction pipe and is adapted to throttle an airflow through the first air conduction pipe by increasing or decreasing a cross-section of the first air conduction pipe;
   wherein the second airflow throttling unit is assigned to the second air conduction pipe and is adapted to throttle an airflow through the second air conduction pipe by increasing or decreasing a cross-section of the second air conduction pipe,
   wherein the third airflow throttling unit is adapted to throttle an airflow in the central air conduction pipe by increasing or decreasing a cross-section of the third air conduction pipe,
   wherein the vacuum generating device is adapted to generate negative pressure in the first air conduction pipe and in the second air conduction pipe so that the first suction volume can be removed via the first air suction device by suction, and the second suction volume can be removed via the second air suction device by suction;
   wherein the vacuum generating device is adapted to generate negative pressure in the central air conduction pipe so that in the first air conduction pipe and in the second air conduction pipe negative pressure is generated,
   wherein the control unit is adapted to control the suction volume control device so that the airflow from the first air suction device to the first air conduction pipe is controllable,
   wherein the control unit is adapted to control the suction volume control device such that the airflow from the second air suction device to the second air conduction pipe is controllable,
   wherein the control unit is configured to adjust the ratio of the air volume flow in the first air conduction pipe and the second air conduction pipe as well as the sum of the air volume flows by controlling the first throttling unit, the second throttling unit, and the third throttling unit,
   wherein one of the first suction volume and the second suction volume is a room selected from the group consisting of a galley, an on-board toilet, and a lavatory,
   wherein the control unit is configured to instruct the vacuum generating device to increase the negative pressure in case the maximum size of the cross section of the opening of the third throttling unit is achieved,
   wherein the control unit is configured to control the air volume flow in first, second and third levels by controlling one or more of the first and second air suction devices, the first, second and third airflow throttle units, the sum of the air volume flows of the first and second air conduction pipes and the air volume flow of the central air conduction pipe.

* * * * *